(12) United States Patent
Olson et al.

(10) Patent No.: US 8,068,207 B2
(45) Date of Patent: Nov. 29, 2011

(54) INTERMEDIATE FILM IDENTIFIER MARKING

(75) Inventors: Robert Arthur Olson, Moorpark, CA (US); Warren Raymond Proulx, Jr., Burbank, CA (US); Frank Joseph Macedo, Jr., Agoura Hills, CA (US); Steven Garlick, Chino Hills, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 219 days.

(21) Appl. No.: 12/448,284

(22) PCT Filed: Dec. 26, 2006

(86) PCT No.: PCT/US2006/049205
§ 371 (c)(1),
(2), (4) Date: Jun. 16, 2009

(87) PCT Pub. No.: WO2008/079124
PCT Pub. Date: Jul. 3, 2008

(65) Prior Publication Data
US 2010/0079727 A1    Apr. 1, 2010

(51) Int. Cl.
*G03B 21/32*    (2006.01)
*B44B 5/00*    (2006.01)

(52) U.S. Cl. .......................... 352/130; 352/244; 352/56

(58) Field of Classification Search .................... 352/39, 352/40, 44, 130, 244; 33/751, 666, 614, 33/622, 623
See application file for complete search history.

(56) References Cited

U.S. PATENT DOCUMENTS

| | | | | |
|---|---|---|---|---|
| 4,194,817 A * | 3/1980 | Staudacher et al. | ........... | 352/169 |
| 4,659,199 A * | 4/1987 | Jarvis et al. | ...................... | 352/92 |
| 4,868,871 A | 9/1989 | Watson, III | | |
| 4,983,991 A * | 1/1991 | Palonen | ................... | 346/33 ME |
| 6,226,388 B1 | 5/2001 | Qian et al. | | |
| 6,438,231 B1 | 8/2002 | Rhoads | | |
| 6,621,929 B1 | 9/2003 | Lai et al. | | |
| 6,930,759 B2 * | 8/2005 | Roddy et al. | ..................... | 355/67 |
| 7,113,615 B2 | 9/2006 | Rhoads et al. | | |
| 7,152,163 B2 | 12/2006 | Mihcak et al. | | |
| 7,777,859 B2 * | 8/2010 | Zolla et al. | ....................... | 352/46 |
| 2003/0048908 A1 | 3/2003 | Hamilton | | |
| 2003/0072037 A1 | 4/2003 | Hamilton | | |
| 2003/0150547 A1 * | 8/2003 | Kesti et al. | ..................... | 156/212 |
| 2010/0110411 A1 * | 5/2010 | Olson et al. | ...................... | 355/77 |

FOREIGN PATENT DOCUMENTS

| EP | 1369190 | 12/2003 |
|---|---|---|
| JP | 1295239 | 11/1989 |
| JP | 2001266160 | 9/2001 |

(Continued)

OTHER PUBLICATIONS

Ayromlou et al.: "Probabilistic Matching of Image—to Model-Features for Real-Time Objects Tracking," Proceedings of 16th Int'l. Conference on Pattern Recognition, Aug. 11-15, 2002, vol. 3, IEEE 2002, pp. 692-695.

(Continued)

*Primary Examiner* — William C Dowling
(74) *Attorney, Agent, or Firm* — Robert D. Shedd; Robert B. Levy; Jeffrey D. Hale

(57) ABSTRACT

A method includes impacting at least one identifier on a section of passing film for identifying the film as a source for content copied from the film.

5 Claims, 2 Drawing Sheets

FOREIGN PATENT DOCUMENTS

| | | |
|---|---|---|
| WO | WO-03021861 | 3/2003 |
| WO | WO-03021862 | 3/2003 |

OTHER PUBLICATIONS

Babu et al.: "Robust Tracking with Motion Estimation and Kernel-Based Color Modelling", IEEE International Conference on Image Processing, 2005 (ICIP 2005), Sep. 11-14, 2005, vol. 1, pp. I-717-I-720.

Ginhoux et al.: "Model-Based Object Tracking Using Stereo Vision", Proceedings of the 2001 IEEE International Conference, on Robotics & Automation, Seoul, Korea, May 21-26, 2001, pp. 1226-1232.

Nickels et al.: "Estimating Uncertainty in SSD-Based Feature Tracking," Image and Vision Computing, vol. 20, Jan. 1, 2002, pp. 47-68.

Sangi et al.: "A Likelihood Function for Block-Based Motion Analysis," IEEE International Conference on Image Processing, 2005 (ICIP 2005), Sep. 11-14, 2005, vol. 1, pp. I-1085-I-1088.

Woelk et al.: "A Monocular Collision Warning System", Proceedings of the Second Canadian Conference on Computer and Robot Vision, (CRV'05), May 9-11, 2005, pp. 220-227.

Woelk et al.: "Fast Monocular Bayesian Detection of Independently Moving Objects by a Moving Observer," Proceedings on Pattern Recognition, 26th DAGM Symposium, Tubingen, Germany, Aug. 30-Sep. 1, 2004, vol. 3175/2004, pp. 1-9, Lecture notes in Computer Science, Springer-Verlag, Berlin, Germany.

International Search Report, Sep. 19, 2007.

* cited by examiner

INTERMEDIATE FILM IDENTIFIER MARKING

This application claims the benefit, under 35 U.S.C. §365 of International Application PCT/US2006/049,205, filed 26 Dec. 2006, which was published in accordance with PCT Article 21(2) on 3 Jul. 2008, in English.

FIELD OF THE INVENTION

The present invention generally relates to film and more particularly to marking an identifier on a film.

BACKGROUND OF THE INVENTION

The large amounts of resources invested in film production makes it imperative that film content be protected from unauthorized copying or illegal distribution. Encryption and encoding techniques exist for protecting digital forms of film content. These techniques do not protect content on film negatives from unauthorized copying. Processing of film negatives by laboratories must be secure to prevent unauthorized copying or pirating of copyrighted film content.

Security markings or codes have been used in positive film prints, but these do not aid in identifying DVDs or computer files of motion pictures processed by laboratories from which unauthorized copying of film content occurred. One aspect of preventing unauthorized copying is to trace the source of the film processing laboratory that had possession of a film negative from which content was pirated or copied. Previous coding of film negatives required producing defects into the film, which may be deemed unacceptable to creative teams at film or motion picture studios.

Accordingly, there is a need for easy identification of the facility or laboratory in possession of a particular element of a film negative processed that was used to create a unauthorized copying of copyrighted film content.

SUMMARY OF THE INVENTION

A method includes impacting at least one identifier on a section of passing film for identifying the film as a source for content copied from the film.

An apparatus includes a guide having an opening and for being positioned over a film and an implement for being passed through the opening and impacting an identifier on the film.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

Figure 1:
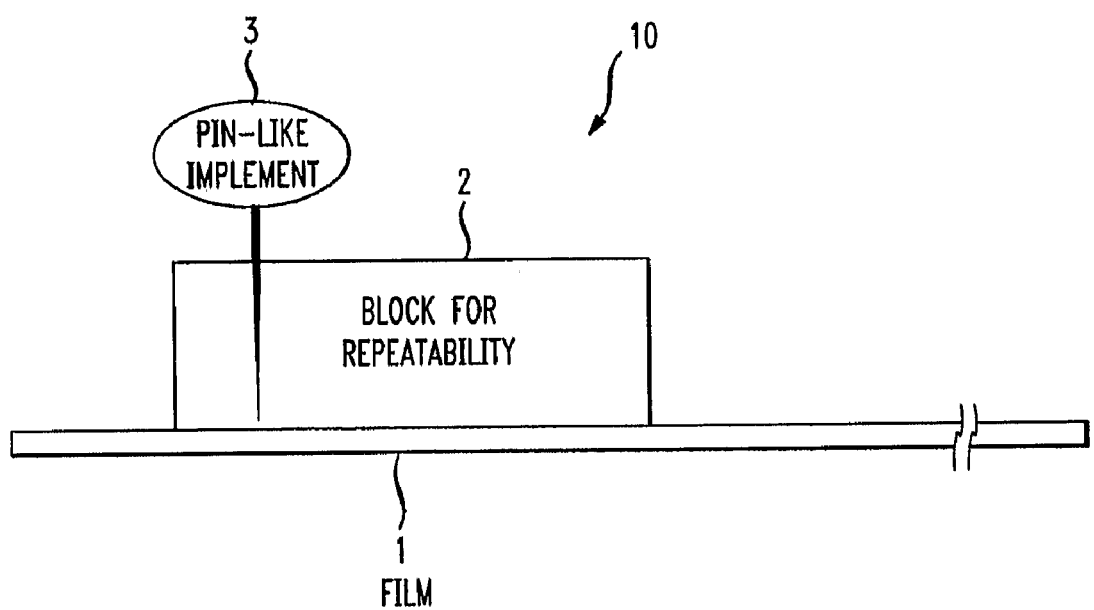
FIG. 1 is a schematic diagram of an exemplary device for marking an identifier code on a film negative in accordance with the present invention.
Figure 2:
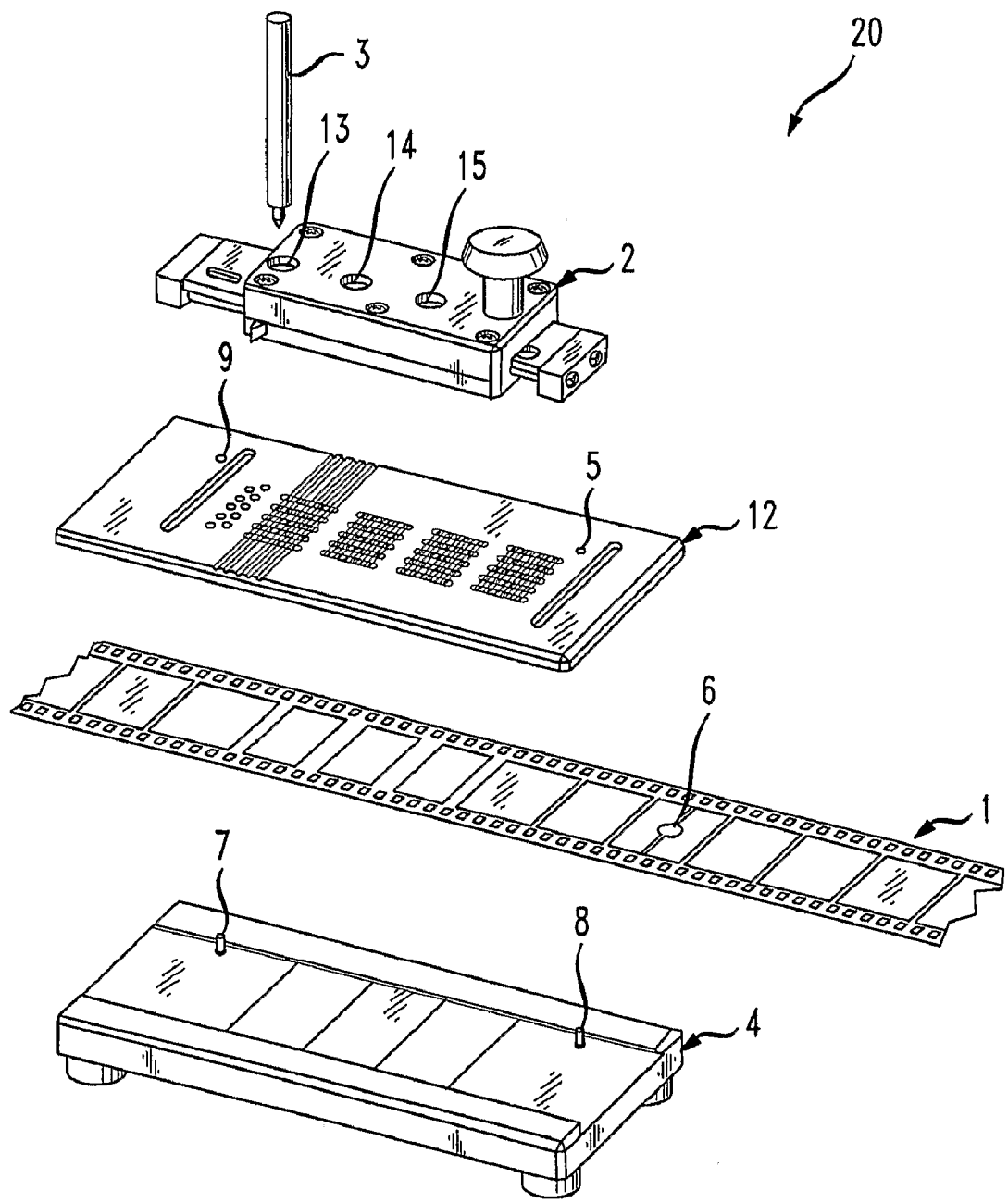
FIG. 2 is perspective diagram illustrating marking a film negative with identifier coding in accordance with the present invention.

Referring now to the schematic diagram 10 of FIG. 1, there is shown a device for placing a physical marking on a film negative 1 with a coding for identifying the particular film 1 sample. The diagram 20 of FIG. 2 shows a perspective view of an application of the inventive coding marking according to FIG. 1. The inventive marking of a film negative preferably places a mark or marks onto the film in the most inconspicuous areas of the film, so as to avoid being detected by film pirates or by the general viewing public.

A record of the film coding can be used to identify which film duplicate was the source for unauthorized copying of film content in the film duplicate. By tracking which film sample was processed by a particular laboratory, the unique coding can be obtained from unauthorized copies of the film content and the laboratory that processed the film duplicate and was the source for the unauthorized film content copy can be identified.

The film 1 sample is passed under a pin like implement 3 which is impacted on the film 1 to leave a physical identifier on a location of the film that does not adversely affect the media content on the film. Preferably the pin like implement is passed through a guide 2 or block which can assure repeatability. In the preferred embodiment, a mark or marks can be placed onto the film in the most inconspicuous areas of the film, so as to avoid being detected by film pirates or by the general viewing public. The pin like implement can be passed through the guide to impact the film duplicate in a location where the film content is not compromised. The processed inter-negative duplicate of an original film is hand-coded or may be automatically coded at distinct locations with the pin-like implement 3.

Turning now to FIG. 2, a film 1 section is passed between a bottom plate 4 and top plate 12. The bottom plate optionally has guide pins 7,8 that mate with respective guide holes 9, 5 on the top plate, to aid in maintaining alignment between the bottom and top plates 4,12. The guide 2, shown in block form, is positioned over the top plate and allows the pin like implement 3 to pass through an opening and impact the film to leave an identifier mark 6 on the film 1. The pin 2 can be passed through the guide in a particular sequence or timing to impact a distinct marking pattern or code on the film 1 that can identify the film 1. Alternatively, the guide can be configured with a pattern of openings for passing the pin implement 3 through to impact a distinct impact pattern or code on the film 1. Alternatively again, multiple pin like implements can be passed through respective multiple openings in the guide to impact a unique pattern of identifiers.

Having described a preferred embodiment for impacting a coding pattern on a film, which is intended to be illustrative and not limiting, it is noted that modifications and variations can be made by persons skilled in the art in light of the above teachings. For example, the guide 2 is shown with three linearly aligned openings 13,14,15, but a different number and pattern of opening can be utilized to uniquely identify the film. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. An apparatus comprising,
    a guide having an opening and for being positioned over a film; and
    an implement for being passed through the opening and impacting an identifier on the film.
2. The apparatus of claim 1, wherein the implement is a pin like implement.

3. The apparatus of claim 1, wherein the guide is a block with the opening passing through the guide.

4. The apparatus of claim 1, further comprising a top guide and a bottom guide between which the film is passed.

5. The apparatus of claim 4, wherein the top guide is positioned between the guide and film.

* * * * *